(12) United States Patent
Randriamasy et al.

(10) Patent No.: US 7,443,832 B2
(45) Date of Patent: Oct. 28, 2008

(54) DEVICE FOR DETERMINING SWITCHING PATHS IN A LABEL SWITCHED COMMUNICATION NETWORK IN THE PRESENCE OF SELECTION ATTRIBUTES

(75) Inventors: Claire-Sabine Randriamasy, Meudon (FR); Yacine El Mghazli, Arcueil (FR)

(73) Assignee: Alcatel, Paris (FR)

( * ) Notice: Subject to any disclaimer, the term of this patent is extended or adjusted under 35 U.S.C. 154(b) by 1046 days.

(21) Appl. No.: 10/735,895

(22) Filed: Dec. 15, 2003

(65) Prior Publication Data

US 2004/0190490 A1 Sep. 30, 2004

(30) Foreign Application Priority Data

Dec. 17, 2002 (FR) .................................. 02 15966

(51) Int. Cl.
*H04J 1/16* (2006.01)

(52) U.S. Cl. ........................ 370/351; 370/389; 370/401

(58) Field of Classification Search ................. 370/351, 370/389, 401
See application file for complete search history.

(56) References Cited

U.S. PATENT DOCUMENTS

| | | | |
|---|---|---|---|
| 6,034,946 A | 3/2000 | Roginsky et al. | |
| 6,301,244 B1 | 10/2001 | Huang et al. | |
| 6,944,159 B1 * | 9/2005 | Fotedar et al. | 370/392 |

(Continued)

FOREIGN PATENT DOCUMENTS

WO WO 02/03716 A1 1/2002

OTHER PUBLICATIONS

Rouhana N et al: "Differentiated services and integrated services use of MPLS" Jul. 3, 2000, pp. 194-199, XP010505346.

(Continued)

*Primary Examiner*—Edan Orgad
*Assistant Examiner*—Jay P Patel
(74) *Attorney, Agent, or Firm*—Sughrue Mion, PLLC

(57) ABSTRACT

A device (D) dedicated to determining data stream switchpath(s) in a label switched network comprises a table (Tn1) of correspondences between sets of service data and information data representative of at least two criteria, a descriptive structure (Tn2) containing information data representative of the state of utilization and of the topology of the network, and a processing module (Pn) adapted i) to receive a path set-up request containing a set of service data associated with a stream to be switched, to determine in said table (Tn1) the criteria associated with said set of service data associated with the stream, ii) to ensure the connectivity of the network nodes on the basis of information data stored in said descriptive structure (Tn2), iii) to calculate from among the nodes of the network possible paths between a departure node (LER1) and a destination node (LER2) taking account of the criteria, and then to deduce an ideal solution from performances of the possible paths on the criteria, iv) to assign each possible path an interest value taking account of the ideal solution and then to classify said possible paths taking account of their respective interest values, and v) to select one of the classified possible paths and then to associate with the stream to be switched a label representative of the selected path so that said labeled stream is switched to the destination node.

21 Claims, 1 Drawing Sheet

U.S. PATENT DOCUMENTS

Figure 1:
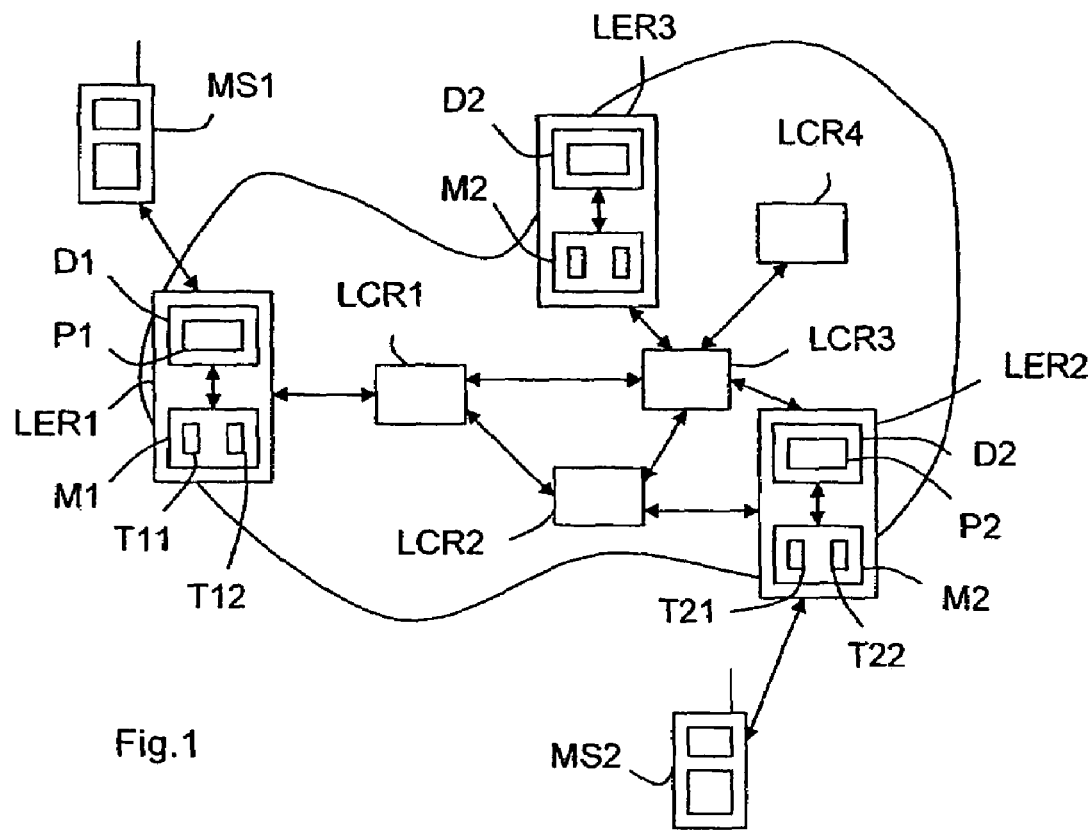

| | | | |
|---|---|---|---|
| 6,965,572 B1 * | 11/2005 | Boodaghians | 370/249 |
| 7,072,346 B2 * | 7/2006 | Hama | 370/395.53 |
| 7,230,924 B2 * | 6/2007 | Chiu et al. | 370/237 |
| 7,242,679 B1 * | 7/2007 | Cortez et al. | 370/351 |
| 7,246,175 B1 * | 7/2007 | Tappan et al. | 709/245 |
| 7,269,132 B1 * | 9/2007 | Casey et al. | 370/219 |
| 7,274,654 B2 * | 9/2007 | Yang et al. | 370/217 |
| 7,277,386 B1 * | 10/2007 | Ferguson et al. | 370/230 |
| 7,283,477 B1 * | 10/2007 | Fedyk et al. | 370/237 |
| 2003/0028670 A1 * | 2/2003 | Lee et al. | 709/241 |
| 2004/0202171 A1 * | 10/2004 | Hama | 370/395.1 |

OTHER PUBLICATIONS

Chen et al: "Distributed Quality-of-Service Routing in High Sped Networks Based on Selective Probing" Proceedings 23rd Conference on Local Computer Networks: IEEE Computer Society. 'en ligne! Oct. 11-14, 1998, pp. 80-89., XP002253004.

Chen S et al: "An Overview of Quality of Service Routing for Next-Generation High-Speed Networks: Problems and Solutions" IEEE Network, IEEE Inc. New York, US, vol. 12, No. 6, Nov. 1998, pp. 64-79, XP000873129.

Zheng Wang et al: "Quality-of-Service Routing for Supporting Multimedia Applications" IEEE Journal on Selected areas in Communications, IEEE Inc. New York, US, vol. 14, No. 7, Sep. 1, 1996, pp. 1228-1234, XP000626273.

Korkmaz T et al: "An efficient algorithm for finding a path subject to two additive constraints" Computer Communications, Elsevier Science publishers BV, Amsterdam, NL, vol. 25, No. 3, Feb. 15, 2002, pp. 225-238, XP004313430.

\* cited by examiner

DEVICE FOR DETERMINING SWITCHING PATHS IN A LABEL SWITCHED COMMUNICATION NETWORK IN THE PRESENCE OF SELECTION ATTRIBUTES

The invention relates to the field of communication between terminals within a label switched network and more particularly the field of determining data stream switchpaths between a "departure" switching unit and a "destination" switching unit.

The person skilled in the art knows that a label switched network, such as an MPLS or GMPLS network, for example, comprises switching units (or nodes) that are also called label switched routers (LSR). Label switched routers comprise two types of routers or switches that are interconnected: label edge routers (LER), responsible for setting up a label switched path (LSP) for each data stream that they receive when requested to do so by the network manager, and label core routers (LCR), responsible only for switching data streams and transmitting network information data.

Setting up a switched path consists in adding to the data of a stream a label associated with the path to be taken and reserving the resources necessary for routing the stream to the destination node, allowing for the type of service (ToS) and/or the quality of service (QoS) associated with the stream. For each departure LER to be able to set up a path, each stream is associated with a departure LER and a destination LER, a forwarding equivalence class (FEC), and a set of service data defining the type of service (ToS) and/or the quality of service (QoS).

A label switched path LSP is calculated either by determining the shortest path between the departure and destination nodes or by listing a set of nodes that it must include.

Using the list of nodes produced by this calculation, a signaling process sets up the switched path after validating the steps thereof allowing for constraints associated with the QoS and/or ToS required for the stream.

In the former situation, using a single selection criterion (or attribute), such as the length of the path (or the number of hops), generally has the consequence of directing the greater portion of the traffic along the same path, which is therefore congested, even though many other paths, that might be more suitable in the light of criteria other than the length, remain underused. Moreover, the presence of constraints limits the choice of links and can aggravate congestion. Furthermore, the length of the path is not necessarily the most important criterion. Other criteria may prove to be much more pertinent in some applications, for example the required bandwidth.

In the second situation, having recourse to an explicit set of obligatory nodes allowing for a constraint may avoid resource reservation problems but does not facilitate automating the calculation. Moreover, this explicit routing calculation method, whether strict or relaxed, is generally based on empirical knowledge, and this limits its reliability.

In an attempt to improve the situation, it has been proposed to calculate the switched path sequentially allowing for only one criterion, and then to carry out verifications allowing for one or more constraints. However, this method requires a great deal of calculation time in that the LSP originally calculated (generally the shortest one) does not necessarily have resources suited to the constraints associated with the quality of service associated with the stream to be routed and/or does not belong to the administration class associated with the stream to be routed.

Thus an object of the invention is to remedy some or all of the drawbacks previously cited.

To this end it proposes a device for determining labeled data stream switchpath(s) in a label switched communication network comprising a multiplicity of label switched routers (LSRs), these including label edge routers and label core routers.

This device is characterized in that it includes:

memory means storing a table of correspondences between sets of service data (for example representative of a type of service and/or a quality of service) and information data representative of at least two chosen criteria (and optionally weighting factors reflecting the relative importance of these criteria), and a descriptive structure containing information data representative of the state of utilization and of the topology of the network, and processing means adapted:

a) to receive a path set-up request containing a set of service data associated with a stream to be switched, for determining in the table at least two criteria stored in corresponding relationship to said set of service data associated with the stream, b) to ensure the connectivity of the multiplicity of LSRs, on the basis of information data representative of the state of utilization and of the topology of the network, stored in the descriptive structure, c) to calculate from among the LSRs possible paths between a departure LER and a destination LER taking account of at least the two criteria that have been determined and then to deduce an ideal solution from performances of said possible paths on at least the criteria, d) to assign each possible path an interest value taking account of the ideal solution and then classify the possible paths taking account of their respective interest values, and e) to select a path from among the classified possible paths and then associate with the stream to be switched a label representative of said selected path so that said labeled stream is switched via the path to the destination LER.

By definition, two nodes are "connected" if they can exchange data either directly or indirectly via one or more other nodes. In other words, considering a graph of nodes, the graph is connected if each pair of nodes can be connected by a path.

The device according to the invention, the basic version of which as defined hereinabove can be used to set up switched paths in a first multicriteria mode that is characterized by taking account of criteria in the absence of constraints, can also be used to set up switched paths in a second multicriteria mode that is characterized by taking account of criteria in the presence of one or more constraints. To this end, when some information data associated with a set of service data is representative of at least one local constraint, the processing means can determine, from among the multiplicity of LSRs, all the pairs of LSRs that can set up between them an oriented connection supporting each local constraint stored in corresponding relationship to a set of service data associated with the stream to be switched, and then connect all of the LSRs of the pairs.

Instead of, or in addition to this, if certain information associated with a set of service data is representative of at least one global constraint, the processing means can retain from among the possible paths only those that satisfy each global constraint stored in corresponding relationship to a set of service data associated with the stream to be switched, in order to assign interest values to only the possible paths retained.

In the present context "local constraint" means a constraint applied to oriented links (or connections), such as arcs. Also, in the present context, "global constraint" means a constraint applied to a path, such as the number of hops of the path or the maximum duration of the path, for example.

At least one of the criteria used is preferably of the nonadditive type. In this case it is advantageous for the processing means, when calculating possible paths and deducing the ideal solution, to integrate a trace storing a route corresponding to a partial path, to detect and prevent the occurrence of cycles (or loops) in the paths under construction. It is even more advantageous for the processing means to retain certain solutions during the procedure for eliminating partial paths, referred to as "weakly nondominated" on each nonadditive criterion determined.

The processing means of the device according to the invention can have other complementary features individually and/or in combination, and in particular they can:

verify the connectivity (which is a constraint) by applying a mechanism of propagation from the departure node (or LER) to all the other nodes of the multiplicity of nodes, so that each node is visited. They can use the Taran algorithm for this, for example;

determine for each path values representative of its "performance" relative to each criterion determined and to qualify each path for which the performance values are "nondominated" as a possible path. In this case, said processing means can also determine for each criterion the best performance value observed over the possible paths, referred to as the "optimum value", and then construct the ideal solution in the form of a multiple of components consisting of the various optimum values determined. In fact, the connections on which the optimum values are observed rarely constitute a connected sequence. In other words, an ideal path corresponding to an ideal solution exists only in exceptional circumstances;

assign the interest value to each possible path which characterizes the greatest value of the components, associated with the various criteria determined, of a weighted Tchebychev function, as a function of differences between the performance value of the path concerned and the corresponding component of the ideal solution. In this case, they can preselect k possible paths having the k lowest interest values and then select a path from the k preselected paths. Furthermore, they can, if necessary, calculate bidirectional paths. Moreover, they can select from said k paths at least one other path dedicated to connection restoration.

Moreover, it is preferable if:

any local and/or global constraints belong to a group comprising at least the minimum bandwidth required, the maximum length of the path, the maximum duration of the path, one or more prohibited connections, the maximum and/or minimum number of hops on the path, one or more mandatory nodes, one or more prohibited nodes, one or more authorized classes of service, one or more path colors, a wavelength division multiplexing capacity, a concatenation capacity, an assignment capacity, and a protection capacity;

the criteria belong to a group comprising at least the available bandwidth, the number of hops on the path, the duration of the path, a wavelength division multiplexing capacity, a concatenation capacity, an assignment capacity, and a protection capacity. In this case, it is even more preferable if the criteria comprise the available bandwidth and the duration of the path. In this case, the processing means can advantageously impact (or weight) the criterion applying to the duration of the path by a penalty that applies to the administration cost of the path, for example;

the criteria are weighted as a function of their importance in the light of management information. In this case, the weighting factors are preferably stored in the correspondence table and associated with at least some of the criteria.

The invention also relates to a label switched router equipped with a device of the type described hereinabove.

Moreover, the invention is particularly suitable for label switched communication networks, such as Multiprotocol Label Switching (MPLS) networks that process streams made up of asynchronous data cells or packets and Generalized MPLS (GMPLS) networks, which process streams made up not only of asynchronous data cells or packets but also of synchronous frames or light streams.

Figure 2:
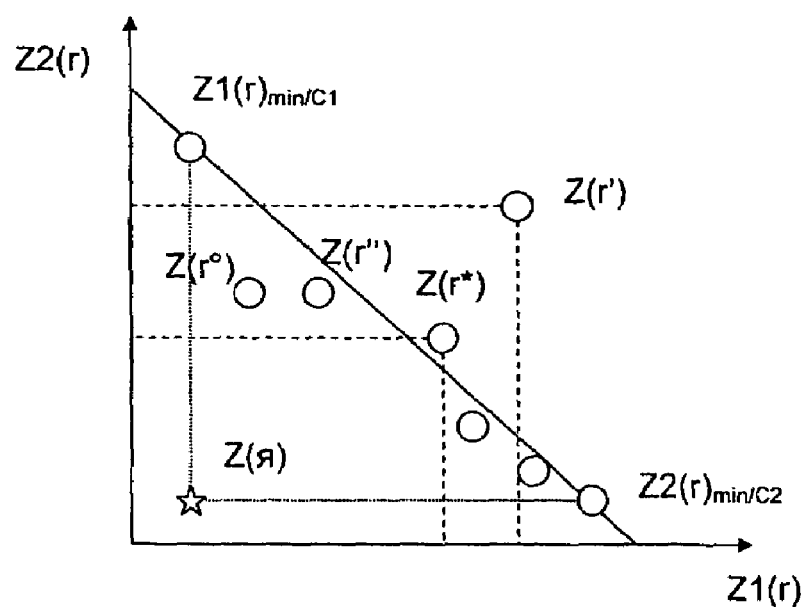

Other features and advantages of the invention will become apparent on reading the following detailed description and examining the appended drawings, in which:

FIG. 1 shows diagrammatically a portion of a label switched communication network including a plurality of edge routers (or nodes) (LERs) equipped with a device in accordance with the invention for calculating switching paths, and FIG. 2 is a graph showing diagrammatically the method of determining nondominated solutions.

The appended drawings can constitute part of the description of the invention as well as, if necessary, contributing to the definition of the invention.

As shown in FIG. 1, a label switched communication network generally includes a multiplicity of label switched routers (or nodes) (LSRs) connected to each other. The LSRs can be grouped into two categories: label edge routers LERn (here n=1 to 3) and label core routers LCRm (here m=1 to 4). As explained hereinafter, the LERs handle setting up switching paths within the network and the LCRs handle switching.

A multiplicity of user or business terminals MSk (here k=1 and 2) are able to connect to at least some of the LERs in order to be able to exchange data between them.

Hereinafter the network is considered to be of the Multi-Protocol Label Switching (MPLS) type. The invention is not restricted to this type of label switched network, of course. It relates generally to all types of label switched network, such as Generalized MultiProtocol Label Switching (GMPLS) networks, for example.

What is more, the terminals MSk are considered hereinafter to be mobile stations, such as mobile telephones, but they could be any type of communication terminal capable of exchanging data with other terminals or network units, such as fixed telephones, facsimile machines, Personal Digital Assistants (PDAs), fixed or mobile computers, and Application Service Provider (ASP) servers, for example.

The invention is intended to determine multicriteria switching paths, with or without constraints, of labeled data streams within a label switched network (here of the MPLS type).

To this end the invention proposes at least one calculation device Dn including a processing module Pn for determining the best LSP type switched path between a departure LER and a destination LER, taking account of at least two criteria, and where applicable of one or more constraints. The calculation of the path can be initiated in a centralized manner (in automatic mode or in manual (or interactive) mode) or in a distributed manner (in automatic mode), by means of a stream to be switched set-up request.

In the present context the expression "switched path" refers to an ordered sequence of nodes (or LSRs) or connections (between two nodes or LSRs) starting at a departure LER and finishing at a destination LER. Of course, a new path can be calculated each time a destination LER of a zone (or domain) of the network is reached, and described in a descriptive data structure (see below), in order to continue routing a data stream. Consequently, only the LERs of an MPLS network are able to set up a switchpath determined by a device D according to the invention and in accordance with the distributed switching protocol of the network.

As the device Dn preferably handles the actual labeling of a stream once its path has been determined (see below), it is preferably installed in each LERn of the MPLS network, as shown in FIG. 1. Consequently, it is considered hereinafter that the device D1 installed in the edge router LER1 to which is connected a terminal MS1 that requires to set up communication with a terminal MS2 connected to the edge router LER2 receives the instruction to determine a switched path between the departure router LER1 and a destination router, for example the router LER2.

Moreover, one embodiment of the device Dn according to the invention is described hereinafter in the situation of setting up a multicriteria switched path in the presence of one or more local and/or global constraints. However, as previously mentioned, the device Dn is also adapted to set up a multicriteria switched path in the absence of constraints.

Remember first that, in a label switched network, each data stream is associated with a departure LER and a destination LER, a forward equivalence class (FEC), and a set of service data defining the type of service (ToS) and/or the quality of service (QoS). Remember also that in a label switched network all the data of a stream that has the same FEC must take the same path (LSP). A stream to be switched is associated with an FEC by the input LER.

When it receives a path set-up request containing a set of service data associated with a stream to be switched, the processing module P1 of the device D1 firstly extracts that set of service data and then accesses a memory M1 in which is stored a table T11 establishing correspondences between sets of service data (for example representative of a type of service and/or a quality of service) and information data representative of at least two chosen criteria.

The memory M1 is preferably installed in the router LER1. In other words, it is preferable to provide a memory Mn in each edge router LERn. However, a single "central" memory accessible to each device Dn could be provided instead.

Once it has determined in the table T11 the set of service data that corresponds to the extracted set, the processing module P1 can extract from that table T11 all of the information data associated with it, and in particular the aforementioned at least two criteria.

It is important to note that each criterion can be associated with a weighting factor representing its level of preference relative to the other criteria. These weighting factors are preferably stored in the correspondence table T11 in association with the corresponding criteria.

Once it has determined the criteria and the constraints associated with the stream to be switched, the processing module P1 interrogates an information data descriptive structure T12 that is preferably stored in the memory M1 and contains information data representative of the state of use and the topology of the network, in order to ensure connectivity of the multiplicity of LSRs of the network.

In particular, the information data defines the resources associated with the various connections between nodes, in terms of characteristics and availability, and the list of LSR nodes, which is regularly updated. The resource characteristics include in particular the topology (available links), bandwidth and transit time between two nodes of a connection. This information is generally provided by a connection status protocol such as the Open Shortest Path First (OSPF) protocol when the latter supports traffic management by exchange of Traffic Engineering—Link State Advertisements (TE-LSAs). Other network utilization characteristics, such as the colors authorized on a connection, the authorized classes of service or the administrative cost of a connection are supplied by the Network Management System (NMS).

To ensure the connectivity of all of the nodes (LSRs), the processing module P1 determines all the pairs of nodes (LSRs) that can set up between them a connection (or a link, defined by a pair (i,j) designating two nodes). In the absence of connectivity, the remainder of the processing cannot be effected.

The processing module P1 then ensures the connectivity of the nodes (LSRs) in the presence of each local constraint. It is important to note that the connectivity of the nodes can be ensured directly in the presence of one or more local constraints, without verifying connectivity in the absence of constraints.

In the present context the expression "local constraint" means any constraint applicable to an oriented connection of a network, such as an arc, and in particular the minimum bandwidth required, the maximum length of a connection, the maximum duration of a connection, and one or more prohibited connections.

This verification preferably consists in determining all the pairs of nodes (LSRs) that can set up between them a connection (or a link, defined by a pair (i,j) designating two nodes) in the presence of each local constraint.

The pairs of nodes are determined by setting up a filtering graph $G(X,U)$, where X represents the set of LSR nodes of the network and U the set of directional links (or connections) (i,j). All the connections of the graph $G(X,U)$ that violate at least one of the local constraints determined are eliminated from the graph, which produces a "filtered" graph.

The processing module P1 then ensures that the filtered graph $G(X,U)$ is connected (in the mathematical sense of this term). It preferably does this using a technique for propagating information from the departure LER node (for example LER1) to all of the LSR nodes of the filtered graph, so that all the LSR nodes are verified (or tested). This verification of the connectivity of the graph can use the Tarjan algorithm, for example.

In the absence of connectivity of the filtered graph, the remainder of the processing cannot be effected.

If the filtered graph is connected, the processing module P1 calculates from among the nodes of the pairs (or connections (i,j)) retained all possible paths (or efficient paths) r* between the departure node LER1 (for example), to which is connected the source terminal MS1 that requires to set up the communication, and a destination node, for example LER2, to which the destination terminal MS2 is connected directly or indirectly, taking account of at least the two criteria determined from the table T11.

In the present context the expression "possible path" means an "efficient" or "pareto-optimal" path whose performance values (see below) are "nondominated". Also, in the present context, the term "criterion" refers to any type of criterion (or metric) that can be taken into account in a network, whether it be of the additive type, such as the duration of the path $C_1$ or the number of hops of the path $C_3$, for example, or of the nonadditive type, such as the available bandwidth $C_2$, for example (which is additionally of the "minimum-maximum"

type). Consequently, the criteria C1 and C2 are preferably always taken into account, whereas the criterion C3 is optional.

Moreover, it may be beneficial to impact (or weight) the criterion C1 (duration of the path) by a weighting factor such as a penalty applied to the administration cost CA of the path, for example. This reduces the calculation vectors (see below) by one dimension, and consequently limits the calculation time and the memory necessary for said calculation.

A possible path $r^*$ is preferably calculated as explained hereinafter. First of all, a path is designated by a variable $r(s,t)$, where s designates the source node and t the destination node, and by a performance vector $Z(r)$ defined by a multiplet of components $(Z1(r), Z2(r), \ldots, Zp(r))$ each associated with one of the p criteria used. For example, the component $Z1(r)$ represents the performance of the path r relative to the criterion C1 and the component $Z2(r)$ represents the performance of the path r relative to the criterion C2.

For an additive criterion, such as C1, the component $Z1(r)$ of the performance $Z(r)$ is defined by the equation $Z1(r) = \Sigma_{(i,j) \in r} C1(i,j)$.

If the criterion C1 is impacted (or weighted) by the penalty CA, the previous equation is written $Z1(r) = \Sigma_{(i,j) \in r} C1(i,j) * CA(i,j)$.

For a nonadditive criterion, such as C2, the component $Z2(r)$ of the performance $Z(r)$ is defined by the equation $Z2(r) = MIN_{(i,j) \in r} C2(i,j)$.

Here, $Cp(i,j)$ designates the value of the criterion Cp for an arc $(i,j)$.

Given the above definitions, a path is qualified as a possible path $r^*(s,t)$, i.e. an "efficient" path, if there is no path that can be envisaged between the nodes s and t satisfying the equation $Zp(r) \leq Zp(r^*)$, $\forall p=1$ to P (where P is the total number of criteria used), and $Zp'(r) < Zp'(r^*)$ for any of the components p belonging to the set $\{1, \ldots, p\}$.

The performance vector $Z(r^*)$ of the path $r^*$ is then called a nondominated solution (NDS) if all other paths r' have a performance vector $Z(r')$ at least one component $Zp(r')$ of which is "less good"(or "less performing") than the corresponding component $Zp(r^*)$ of the path $r^*$. This kind of path $r^*$, associated with a nondominated performance vector, is then called a possible path (or "efficient path") or "pareto-optimal" path.

FIG. 2 shows one example of nondominated solution (NDS) determination, in the case of two criteria C1 and C2 that are commensurable, i.e. whose metric dimensions can be added and multiplied. This applies equally to incommensurable magnitudes, such as the bandwidth C2. It further applies to sets of mutually incommensurable magnitudes, such as the duration of the path C1 and the bandwidth C2.

In this example, $Z(r^*)$ is a nondominated solution (NDS) since there is no other point for which all the coordinates are strictly lower than those of $Z(r^*)$. Each other point $Z(r)$ has at least one component that is less good than the corresponding component of $Z(r^*)$. In other words, the dashed outline cone below and to the left of $Z(r^*)$ is empty. In this example, $Z(r')$ is dominated by four points, including $Z(r^*)$, that are placed within the dashed outline cone below it, but not by the extreme points $Z1(r)_{min/C1}$ associated with C1 and $Z2(r)_{min/C2}$ associated with C2, which are therefore also nondominated. Here only $Z(r')$ is a dominated solution. Moreover, $Z(r'')$ is a solution that is "weakly nondominated" by $Z(r°)$ because at least one of the components of $Z(r°)$ is equal to (and not strictly less than) its counterpart in $Z(r'')$.

To calculate the various possible paths $r^*$ obtained by the method described hereinabove, an adapted label assignment algorithm can be used, such as the algorithm described in the paper by E. Martins, "On a multi-criteria shortest path problem", European Journal Of Operational Research, Vol. 16, pages 236-245, 1984.

The adaptation consists in particular in integrating into the additive criteria processed by the Martins algorithm a nonadditive criterion such as a "minimum-maximum" criterion, for example. Integrating this kind of criterion imposes adaptations of the algorithm, for example those mentioned below.

A first adaptation can consist in integrating into the path calculation algorithm (corresponding to step d) of the process) a trace storing the route corresponding to a partial path, to detect and prevent the occurrence, in the paths under construction, of cycles (or routes) in the progress of the algorithm.

A second adaptation, that is preferably combined with the first, can consist in retaining weakly nondominated solutions on the "minimum-maximum" criterion during the procedure of eliminating partial paths. Considering three criteria C1, C2, C3, for example, of which the first two are additive and the third is of the "minimum-maximum" type, the point $z=(3, 2, 4)$ is dominated by the point $z°=(1, 1, 4)$ for the criteria C1 and C2 but is weakly nondominated for the criterion C3. The point z and the corresponding partial path are therefore retained. This makes it possible to consider four possible efficient paths. However, the solutions corresponding to the final efficient paths (produced in step b) of the process) are all nondominated and not weakly nondominated.

All the possible paths $r^*$ determined are then stored in a memory of the device D (not shown), which guarantees that the best of them, in the light of the criteria and constraints used, has not been omitted.

The processing module P1 then forms an ideal solution $Z(\Re)$. To be more precise, the ideal solution $Z(\Re)$ is a vector taking the form of a multiplet of components.

The components are calculated in the following manner. For each criterion Cp, the best performance value $Z^*p$ observed over the possible paths is extracted. Each best value of performance $Z^*p$ observed is called the optimum value associated with the corresponding criterion. The various optimum values then constitute the components of the ideal solution $Z(\Re)=(Z^*1, Z^*2, \ldots, Z^*p)$, representative of an ideal path $\Re$.

It is important to note that the ideal path represented by the ideal solution $Z(\Re)$ does not necessarily correspond to one of the possible paths $r^*$ of the set of possible paths determined. This is even rarely the case, in that the connections on which the optimum values are observed rarely constitute a connected sequence. Nevertheless, when this is the case, it constitutes the only possible path $r^*$ since it dominates all the others.

The processing module P1 then submits the various possible paths to at least one determined or received global constraint.

In the present contexts, the expression "global constraints" means constraints that can be applied to paths, as opposed to local constraints, that are applied to the connections (or links) between nodes. They can be the minimum bandwidth required, the maximum length of the path, the maximum number of hops of the path, and the maximum duration of the path, for example.

The processing module P1 obtains the possible paths $r^*$ that do not violate the global constraint or constraints used. In the case of setting up a path in multicriteria mode without constraints, this processing is omitted, of course.

The processing module P1 then assigns each possible path r* an interest value (or "path value") U(r) taking account of the ideal solution Z(ℜ).

A standard scalarization function can be used for this, such as a Tchebychev function, for example, weighted as a function of the differences between the components Zp(r) of the performance value Z(r) of the path r concerned and the corresponding components Zp(ℜ) representative of the ideal path ℜ. This kind of function can take the form $U(r)= MAX_{p=1 \text{ to } p}\{Wp(Zp(r)-Zp(ℜ))\}$, where Wp is a weighting coefficient (or factor) of the criterion Cp chosen at the time of configuring the device and used to give the criteria different relative weights, where applicable. This interest value quantifies the performance difference between a possible path r* and the ideal path ℜ, given the respective weights assigned to the various criteria used.

The processing module P1 then classifies the possible paths r* taking account of their respective interest values U(r). With the above definition of the interest value U(r), the possible paths are classified by increasing order of interest value, the lowest interest value U(r) corresponding to the possible path r* most appropriate for transferring the data, given the criteria and constraints used. Classification is therefore effected relative to an ideal point inferred by the data and not a comparison based on arbitrary values.

It then selects from the classified possible paths the k best classified paths, so as to route data via one of these k paths, preferably that which is the best classified (that with the lowest interest value U(r) in the example described here). K is an integer from 1 to 5, for example. It is important to note that the number of paths found by the processing described above can be less than k.

The processing module Pn can also select a second path from the k possible path classified, in order to offer a backup path (or backup LSP) that can be substituted for the first path in the event of problems on that path. However, it is preferable for the (second) backup path to be separate from the (first) path. This in particular makes it possible to offer the connection protection/restoration function to the user.

The possible paths can be used in the context of what the person skilled in the art knows as load distribution.

Once the switchpath has been selected, the processing module P1 associates with the stream to be switched a label representative of said path. The departure edge router LER1 can then set up the selected path by reserving the resources that satisfy the criteria and constraints associated with the received stream. It then transmits the labeled stream to the destination router LER2 via each node LSR of the path that has been determined.

It is important to note that the processing module P can be adapted to calculate bidirectional switched paths. This is particularly beneficial in the case of GMPLS networks.

In GMPLS networks, attributes different from and/or complementary to those described hereinabove can be used, to allow for their respective specifics (time division multiplexing (TDM) networks, such as the SONET and SDH networks, for example, and wavelength division multiplexing (WDM) networks). For example, in the case of wavelength switched networks, transparency can be optimized by minimizing the number of hops on a path taking account of a constraint associated with the maximum distance without signal degradation. As a general rule, the specific attributes can reflect the capacities of the connections, transmitted by way of low-level TLVs and designating wavelength division multiplexing, for example, concatenation, allocation or protection of switching in the case of SDH circuits.

The calculation device D and primarily its processing module or modules P, and possibly the memory or memories M, can be implemented in the form of electronic circuits, software (or data processing) modules, or a combination of circuits and software.

In the foregoing description, reference has been made to (local and global) constraints and criteria that might, in some cases, seem substantially identical. In fact, they can be considered as selection attributes that are sometimes manifested in the form of criteria and sometimes in the form of constraints, given that a criterion is generally the subject of maximization or minimization whereas a constraint is generally defined by one or two fixed or limiting values.

The selection attributes are defined by the network operator when configuring the network and depend on the type of service required, for example sending an e-mail or a videoconference set-up request, and/or the quality of service (or QoS) required at the time of the initial reservation of resources. To be more precise, criteria are chosen as a function of the type of service required, whereas constraints and their values are chosen as a function of the quality of service required.

The invention can equally be considered in the form of a method of determining data stream switchpaths in a label switched communication network including a multiplicity of nodes (LSRs) including edge nodes (LERs) and core nodes (LCRs).

The method can be implemented with the aid of the calculation device D described hereinabove. The main and optional functions and subfunctions provided by the steps of the method being substantially identical to those implemented by the various means constituting the device D, there are summarized hereinafter only steps implementing the main functions of the method according to the invention.

The method includes the following combination of steps:
a) providing table of correspondences Tn1 between sets of service data (for example representative of a type of service and/or a quality of service) and information data representative of at least two chosen criteria (and optionally weighting factors), and a descriptive structure Tn2 containing information data representative of the state of utilization and of the topology of the network,
b) receiving a path set-up request containing a set of service data associated with a stream to be switched, for determining in table Tn1 at least two criteria stored in corresponding relationship to said set of service data associated with the stream,
c) ensuring the connectivity of the multiplicity of LSRs, on the basis of information data stored in the structure Tn2,
d) calculating from among the nodes possible paths between a departure LER and a destination LER taking account of at least the two criteria that have been determined in step b) and then deducing an ideal solution from performances of the possible paths on at least the criteria,
e) assigning each possible path an interest value taking account of the ideal solution and then classifying said possible paths taking account of their respective interest values, and
f) selecting a path from among the classified possible paths and then associating with the stream to be switched a label representative of the selected path so that said labeled stream is switched via said path to the destination LER.

The invention is not restricted to the embodiments of methods, devices and edge routers described hereinabove by way of example only, but encompasses all variants within the scope of the following claims that the person skilled in the art might envisage.

Thus there has been described hereinabove a mode of operation in which account is taken of (at least two) criteria, at least one local constraint and at least one global constraint. However, other modes of operation can be envisaged. A mode of operation can be envisaged in which account is taken of (at least two) criteria and at least one local constraint, with no global constraints. Another mode of operation can be envisaged in which account is taken of (at least two) criteria and at least one global constraint, with no local constraints. Finally, as previously mentioned, a mode of operation can be envisaged in which only criteria (at least two criteria) are taken into account.

Moreover, the foregoing description has referred to edge routers each equipped with a processing module and a memory for service data and information constituting in combination a device according to the invention. However, installing in each edge router only a processing module and providing a shared memory comprising all of the service data and information, for example installed in a dedicated server of the network or in the NMS, can be envisaged. Similarly, a shared processing module and a shared memory containing all of the service data and information, for example, installed on a dedicated server of the network or in the NMS, can be envisaged.

The invention claimed is:

1. A device for determining labeled data stream switchpath(s) in a label switched communication network comprising a multiplicity of label switched routers (LSR), each stream being associated with a chosen forwarding equivalence class and with a chosen set of service data, which device comprises:
   a memory means for storing a table of correspondences between sets of service data and information data representative of at least two chosen criteria and a descriptive structure containing information data representative of a state of utilization and of a topology of the network, and
   a processing means for:
   a) receiving a path set-up request containing a set of service data associated with a stream to be switched, and for determining in said table at least two criteria stored in corresponding relationship to said set of service data associated with the stream,
   b) ensuring the connectivity of said multiplicity of label switched routers, on the basis of information data stored in said descriptive structure,
   c) calculating from among said label switch routers possible paths between a departure node and a destination node taking account of at least one of said two criteria that have been determined and then deducing an ideal solution from performances of said possible paths on at least one of said criteria,
   d) assigning each possible path an interest value taking account of said ideal solution and then classifying said possible paths taking account their respective interest values, and
   e) selecting a path from among said classified possible paths and then associating with said stream to be switched a label representative of said selected path so that said labeled stream is switched via said path to the destination node.

2. A device according to claim 1, wherein said processing means works on the basis of sets of service data stored in said table and representative of a type of service and/or a quality of service.

3. A device according to claim 1, wherein at least some of said information data associated with a set of service data is representative of at least one local constraint, and
   said processing means determines from among said multiplicity of label switched routers all of the pairs of label switched routers that can set up between them an oriented connection supporting each local constraint stored in corresponding relationship to a set of service data associated with said stream to be switched and then ensuring the connectivity of all of the label switched routers of said pairs.

4. A device according to claim 1, wherein some of said information data, associated with a set of service data, is representative of at least one global constraint, and
   said processing means retains from among said possible paths those that satisfy each global constraint stored in corresponding relationship to a set of service data associated with said stream to be switched, so as to assign interest values only to said retained possible paths.

5. A device according to claim 1, wherein at least one of said criteria is of the nonadditive type.

6. A device according to claim 5, wherein said processing means, when calculating possible paths and deducing said ideal solution, intergrates a trace storing a route corresponding to a partial path, so as to detect and prevent the occurrence of cycles in the paths under construction.

7. A device according to claim 6, wherein said processing means retains solutions that are "weakly nondominated" on each nonadditive criterion determined, during the procedure of eliminating said partial paths.

8. A device according to claim 1, wherein said processing means verifies said connectivity by applying a mechanism of propagation from the departure node to all the label switched routers of said multiplicity of label switched routers, so that each label switched router is visited.

9. A device according to claim 1, wherein said processing means determines for each path, values representative of its "performance" relative to each criteria determined and to qualify a path for which said performance values are "nondominated" as a possible path.

10. A device according to claim 9, wherein said processing means determines for each criterion determined, the best performance value observed over said possible paths, referred to as the "optimum value", and then constructs said ideal solution in the form of a multiple of components consisting of the various optimum values determined.

11. A device according to claim 10, wherein said processing means assigns an interest value to each possible path when it characterizes the greatest value of the components, associated with the various criteria determined, of a weighted Tchebychev function, as a function of differences between the performance of said possible path and the corresponding optimum value of said ideal solution.

12. A device according to claim 11, wherein said processing means preselects k possible paths having the k lowest interest values and then selects a path from the k preselected paths.

13. A device according to claim 12, wherein said processing means calculates bidirectional paths.

14. A device according to claim 12, wherein said processing means selects from said k paths at least one other path dedicated to connection restoration.

15. A device according to claim 3, wherein said local and/or global constraints determined belong to a group comprising at least the minimum bandwidth required, the maximum length of the path, the maximum duration of the path, a set of prohibited or mandatory connections, the maximum and/or minimum number of hops on the path, one or more mandatory nodes, one or more prohibited nodes, at least one authorized class of service, a set of path colors, a wavelength division multiplexing capacity, a concatenation capacity, an assignment capacity, and a protection capacity.

16. A device according to claim 1, wherein said criteria belong to a group comprising at least the available bandwidth, the number of hops on the path, the duration of the path, a wavelength division multiplexing capacity, a concatenation capacity, an assignment capacity, and a protection capacity.

17. A device according to claim 16, wherein said criteria comprise the available bandwidth and the duration of the path.

18. A device according to claim 17, wherein said processing means impacts said criterion applying to the duration of the path by a penalty.

19. A device according to claim 18, wherein said penalty applies to the administration cost of the path.

20. A device according to claim 1, wherein said correspondence table comprises weighting factors associated with at least some of said criteria wherein each said weighting factor represents the importance of each said respective criteria with respect to the other criteria.

21. A label edge router for a label switched communication network, comprising a device according to claim 1.

* * * * *